(12) United States Patent
Delst et al.

(10) Patent No.: US 11,945,972 B2
(45) Date of Patent: *Apr. 2, 2024

(54) COMPOSITION INCLUDING A COLOR SHIFTING PIGMENT AND A COLOR FILTER

(71) Applicant: VIAVI SOLUTIONS INC., Chandler, AZ (US)

(72) Inventors: Cornelis Jan Delst, Fairfax, CA (US); Paul Thomas Kohlmann, Windsor, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/311,790

(22) Filed: May 3, 2023

(65) Prior Publication Data

US 2023/0272230 A1 Aug. 31, 2023

Related U.S. Application Data

(63) Continuation of application No. 16/702,191, filed on Dec. 3, 2019.

(60) Provisional application No. 62/774,660, filed on Dec. 3, 2018.

(51) Int. Cl.
*C09D 5/29* (2006.01)
*B42D 25/369* (2014.01)
*B42D 25/373* (2014.01)
*B42D 25/378* (2014.01)

(52) U.S. Cl.
CPC .............. *C09D 5/29* (2013.01); *B42D 25/369* (2014.10); *B42D 25/378* (2014.10); *B42D 25/373* (2014.10)

(58) Field of Classification Search
CPC .. B42D 25/369; B42D 25/373; B42D 25/378; C09D 5/29
See application file for complete search history.

(56) References Cited

U.S. PATENT DOCUMENTS

2002/0160194 A1 10/2002 Phillips et al.
2008/0258118 A1 10/2008 Horie et al.

FOREIGN PATENT DOCUMENTS

WO 02/31058 A1 4/2002
WO 02/090002 A2 11/2002

*Primary Examiner* — Christopher M Polley
*Assistant Examiner* — Sathavaram I Reddy
(74) *Attorney, Agent, or Firm* — Mannava & Kang, P.C.

(57) ABSTRACT

A composition including a first color shifting pigment having a first color shift that extends from a starting color at normal through a plurality of colors as a viewing angle is increased to a final color, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; wherein the composition has a second color shift different from the first color shift; and wherein the second color shift has a first portion that rotates counterclockwise relative to the origin and a second portion that rotates clockwise relative to the origin is disclosed. A security device including the composition is included. A method of making the composition and a method of authenticating the security device are also disclosed.

20 Claims, 6 Drawing Sheets

COMPOSITION INCLUDING A COLOR SHIFTING PIGMENT AND A COLOR FILTER

RELATED APPLICATION

This patent application is a continuation of under 35 U.S.C. § 120 of U.S. patent application Ser. No. 16/702,191, filed Dec. 3, 2019, which claims priority to U.S. Provisional Application No. 62/774,660, filed Dec. 3, 2018, the entire disclosures of which are incorporated herein by reference.

FIELD OF THE INVENTION

The present disclosure generally relates to a composition including a first color shifting pigment having a first color shift that extends from a starting color at normal through a plurality of colors as a viewing angle is increased to a final color, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; wherein the composition has a second color shift different from the first color shift; and wherein the second color shift has a first portion that rotates counterclockwise relative to the origin and a second portion that rotates clockwise relative to the origin. A security device is also included. Methods of making the composition and a method of authenticating the security device are also disclosed.

BACKGROUND OF THE INVENTION

Color shifting pigments and colorants have been used in numerous applications, ranging from automobile paints to anti-counterfeiting inks for security devices, such as documents and currency. Such pigments and colorants exhibit the property of changing color upon variation of the angle of incident light, or as the viewing angle of the observer is shifted. The primary method used to achieve such color shifting is to disperse small flakes, which are typically composed of multiple layers of thin films having particular optical characteristics, throughout a liquid medium, to form a paint or ink that can then be subsequently applied to the surface of a substrate.

Security devices generally use a single color shifting pigment wherein the color shift is one-way, for example, from a color having a longer wavelength to a color having a smaller wavelength, and in a single example with a single color filter to adjust hue. In this manner, upon tilting a color shift goes from a first color to a second color to black so that only a single color is active at a time. However, a counterfeiter could obtain the color shifting pigment and therefore could possibly replicate the security device.

SUMMARY OF THE INVENTION

In an aspect, there is disclosed a composition including a first color shifting pigment having a first color shift that extends from a starting color at normal through a plurality of colors as a viewing angle is increased to a final color, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; wherein the composition has a second color shift different from the first color shift; and wherein the second color shift has a first portion that rotates counterclockwise relative to the origin and a second portion that rotates clockwise relative to the origin.

In another aspect, there is disclosed a method for making a composition including selecting a first color shifting pigment having a first color shift that extends from a starting color at normal through a plurality of colors as a viewing angle is increased to a final color at perpendicular to normal, wherein the first color shift rotates counterclockwise relative to, and about, an origin of the L*a*b* color space; selecting a color filter that transmits a portion of the first color shift of the first color shifting pigment and absorbs a remainder of the first color shift of the first color shifting pigment; and combining the first color shifting pigment and the color filter to form a composition; wherein the composition has a second color shift different from the first color shift; and wherein the second color shift has a first portion that rotates counterclockwise relative to the origin and a second portion that rotates clockwise relative to the origin.

In another aspect, there is disclosed a method of authenticating a security device comprising viewing, at a normal angle, an article imprinted with a composition, wherein the composition includes a first color shifting pigment having a first color shift that extends from a starting color at normal through a plurality of colors as a viewing angle is increased to a final color at perpendicular to normal, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; and viewing, at a viewing angle, the imprinted article; wherein the composition has a second color shift different from the first color shift; and wherein the second color shift has a first portion that rotates counterclockwise relative to the origin and a second portion that rotates clockwise relative to the origin.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
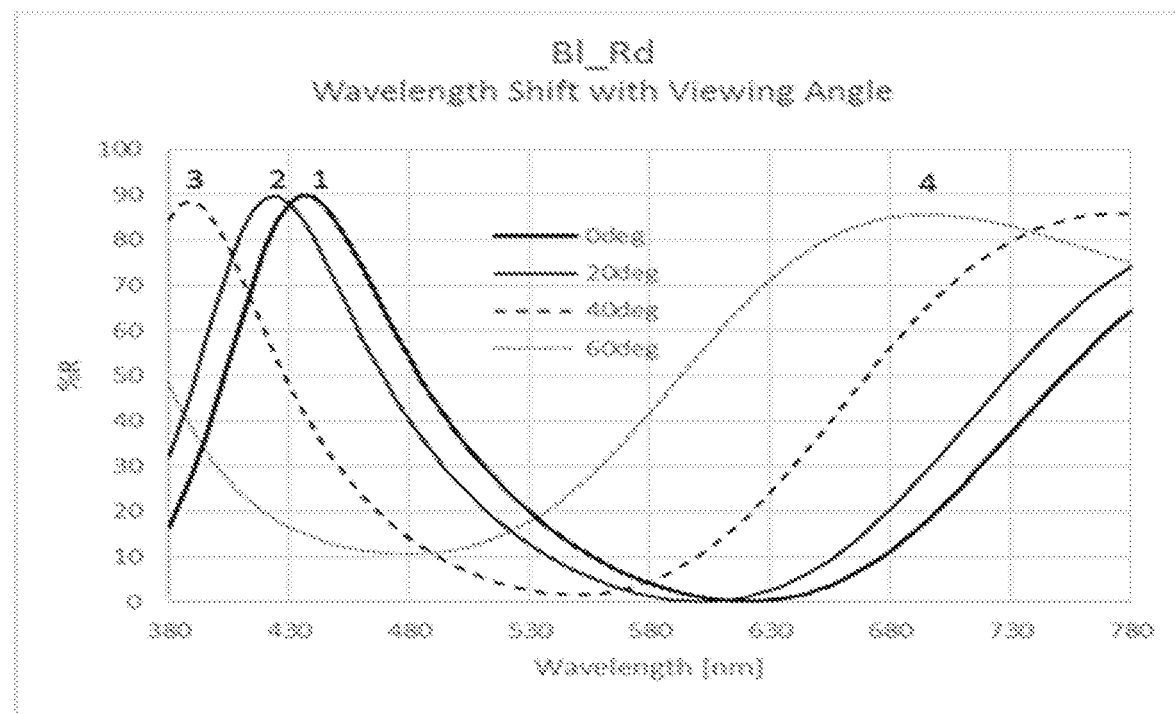
FIG. 1 illustrates a first color shift of a first color shifting pigment as a measurement of reflectance with viewing angle change.

It is to be understood that both the foregoing general description and the following detailed description are exemplary and explanatory only, and are intended to provide an explanation of various embodiments of the present teachings. The components shown in each Figure may be described with regard to a particular Figure, but it is understood that the description of a particular component would be applicable to a component in the other Figures.

In its broad and varied embodiments, disclosed herein are compositions including color filters and pigments, for example, in the form of foils, sheets, and flakes; security devices; and a method of manufacturing the composition and a method of authenticating a security device. The composition can include a liquid medium, such as a solvent. The composition can be in the form of a paint, an ink, a varnish, a colorant composition, etc.

The composition can include a first color shifting pigment having a first color shift that extends from a starting color at normal through a plurality of colors as a viewing angle is increased to a final color, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; wherein the composition has a second color shift different from the first color shift; and wherein the second color shift has a first portion that rotates counterclockwise relative to the origin and a second portion that rotates clockwise relative to the origin.

The composition can include a first color shifting pigment. In an aspect, the composition can include additional color shifting pigments, such as a second color shifting pigment, a third color shifting pigment, etc. If additional color shifting pigments are present in the composition, they can be the same or different from the first color shifting pigment. For ease of understanding, the specification will only refer to a first color shifting pigment. The first color shifting pigment can each be in a form of a flake, a foil, or a sheet. The first color shifting pigment can include at least the following layers: a reflector layer, a spacer layer, and an absorber layer. In an aspect, the first color shifting pigment can include a magnetic layer.

The reflector layer can be a metal layer. Non-limiting examples of suitable metallic materials for the reflector layer include aluminum, silver, copper, gold, platinum, tin, titanium, palladium, nickel, cobalt, rhodium, niobium, chromium, and combinations or alloys thereof. In an aspect, the thickness of the reflector layer can be sufficient for making the layer opaque. The reflector layer can be formed to have a suitable physical thickness of from about 40 to about 2,000 nm, and for example from about 60 to about 1,000 nm. The reflector layer can have a reflectivity of at least 40% and for example higher than 60%.

The absorber layer can be partially absorbing, partially light transmitting, possibly a metal layer with a thickness in the range of from about 5 to about 15 nm. Non-limiting examples of suitable light-absorber materials include metallic absorbers such as chromium, aluminum, nickel, silver, copper, palladium, platinum, titanium, vanadium, cobalt, iron, tin, tungsten, molybdenum, rhodium, and niobium, as well as their corresponding oxides, sulfides, and carbides.

Other suitable light-absorber materials include carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials can be used to form the absorber layer.

Examples of suitable alloys of the above absorber materials include Inconel (NiCr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layer can also be composed of an absorbing metal oxide, metal sulfide, metal carbide, or combinations thereof. For example, an absorbing sulfide material is silver sulfide. Other non-limiting examples of suitable compounds for the absorber layer include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, for example x=0 to 1, y=0 to 1, and z=0 to 1, where x+y=1 in $TiN_xO_y$ and x+y+z=1 in $TiN_xO_yC_z$. For $TiN_xC_y$, for example x=0 to 1 and z=0 to 1, where x+z=1. Alternatively, the absorber layer can be composed of a titanium-based alloy disposed in a matrix of Ti, or can be composed of Ti disposed in a matrix of a titanium-based alloy.

A dielectric layer can act as a spacer layer. The spacer layer can be formed to have an effective optical thickness for imparting interference color and desired color shifting properties. The spacer layer can be optionally clear, or can be selectively absorbing so as to contribute to the color effect of a pigment. The optical thickness is a well-known optical parameter defined as the product ηd, where η is the refractive index of the layer and d is the physical thickness of the layer. Typically, the optical thickness of a layer is expressed in terms of a quarter wave optical thickness (QWOT). The QWOT condition occurs when ηd=λ/4, and λ is the wavelength where optical interference occurs. The optical thickness of dielectric layers can range from about 2 QWOT at a design wavelength of about 400 nm to about 9 QWOT at a design wavelength of about 700 nm, and for example 2, 4, or 6 QWOT at a design wavelength in the range of 400-700 nm, depending upon the color shift desired. The dielectric layer can typically have a physical thickness of about 100 nm to about 800 nm, depending on the color characteristics desired.

Suitable materials for a dielectric layer include those having a "high" index of refraction, defined herein as greater than about 1.65, as well as those have a "low" index of refraction, which is defined herein as about 1.65 or less. A dielectric layer can be formed of a single material or with a variety of material combinations. For example, a dielectric layer can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layer can be formed partially or entirely of high/low dielectric optical stacks, which are discussed in further detail below. When a dielectric layer is formed partially with a dielectric optical stack, the remaining portion of the dielectric layer can be formed with a single material or various material combinations as described above.

Examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide (NdO), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The magnetic layer can be formed of any magnetic material such as nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10% and still achieve the desired results. Thus, cobalt can be present in the alloy in an amount from about 70% to about 90% by weight, and nickel can be present in the alloy in an amount from about 10% to about 30% by weight. Other examples of alloys include Fe/Si, Fe/Ni, FeCo, Fe/Ni/Mo, and combinations thereof Hard magnetics of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. The magnetic material can be selected for its reflecting or absorbing properties as well as its magnetic properties. When utilized to function as a reflector, the magnetic material can be deposited to a thickness so that it is substantially opaque. When utilized as an absorber, the magnetic material can be deposited to a thickness so that it is not substantially opaque. A typical thickness for the magnetic material when utilized as an absorber is from about 2 nm to about 20 nm.

Although this broad range of magnetic materials can be used, the "soft" magnets can be used in some aspects of the invention. As used herein, the term "soft magnets" refers to any material exhibiting ferromagnetic properties but having a remanence that is substantially zero after exposure to a magnetic force. Soft magnets show a quick response to an applied magnetic field, but have very low (coercive fields (Hc)=0.05-300 Oersteds (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has a permeability substantially greater than 1 and that exhibits magnetic hysteresis properties.

In an aspect, the magnetic materials used to form magnetic layers in the flakes and foils of the invention have a coercivity of less than about 2000 Oe, for example less than about 300 Oe. Coercivity refers to the ability of a material to be demagnetized by an external magnetic field. The higher the value of coercivity, the higher the magnetic field required to de-magnetize the material after the field is removed. In an aspect, the magnetic layers used can be "soft" magnetic materials (easily demagnetized), as opposed to "hard" magnetic materials (difficult to demagnetize) which have higher coercivities. The coercivities of the foils, pigments or colorants of the magnetic color shifting pigments according to the invention can be in a range of about 50 Oe to about 300 Oe. These coercivities can be lower than in standard recording materials. The use of soft magnetic materials in pigment flakes allows for easier dispersion of the flakes without clumping.

The magnetic layer can be formed to have a suitable physical thickness of from about 200 angstroms (Å) to about 10,000 Å, and for example from about 500 Å to about 1,500 Å. However, it will be appreciated by those skilled in the art, in view of the disclosure herein, that the optimal magnetic thickness will vary depending on the particular magnetic material used and the purpose for its use. For example, a magnetic absorber layer will be thinner than a magnetic reflector layer based on the optical requirements for such layers, while a covert magnetic layer will have a thickness based solely on its magnetic properties.

The first color shifting pigment can have a first color that extends from a starting color at normal through a plurality of colors as a viewing angle is increased to a final color, wherein the first color shift rotates counterclockwise relative to, and about, an origin of the L*a*b* color space.

In particular, a first color shifting pigment can have a spectral signature shift when a printed article is tilted. The spectral signature includes peaks and valleys that can be measured as % reflectance (R) by a spectrophotometer. For example, as shown in FIG. 1, a first color shifting pigment can be constructed to have a reflectance peak (1) at 435 nm when measured at normal incidence (0 degrees). When measured at 20 degrees from normal, the peak (2) moves to 425 nm. When the angle is increased to 40 degrees, the peak (3) shifts further downward to 390 nm. At a measured angle of 60 degrees, the blue peak has moved to the ultraviolet and can no longer be seen by the human eye. At the same time, a new peak (4) that was previously in the infrared has shifted into the visible wavelength range. The new peak (4) is located at 700 nm when measured at 60 degrees.

This color shift can be simply described in terms of the colors of the visible spectrum. In this case, the visual color of a pigment that has a peak (1) at 435 nm when viewed at normal is blue. As the viewing angle is increased to 20 degrees, the peak (2) moves to shorter wavelengths resulting in a shift toward violet. At 40 degrees, the first peak (3) is deep violet, while the peak (not numbered) that was in the infrared is now at 780 nm which is seen by our eyes as red. The combined reflected light from the violet peak and the red peak appears purple. Lastly, when measured at 60 degrees the peak that was blue at normal has now nearly completely left the visible window. In contrast, the longer wavelength peak (4) is reflecting a great deal of red light.

The overall effect is a pigment that shifts from Blue to Red as a function of viewing angle.

The same example is more difficult to describe numerically because discussion of color is limited to the range of wavelengths that can be seen by the human eye (380 nm to 780 nm). Although the spectral signature steadily shifts to lower wavelengths as the viewing angle is increased, in some cases the primary feature can leap from a short wavelength to a long wavelength as features move into or out of the range of visible wavelengths. The present invention might be described as a technique that can reverse the rule that colors shift from those associated with longer wavelengths to shorter wavelengths as viewing angle is increased. While this description is accurate, this example has shown that the move from shorter wavelengths to longer wavelengths occurs periodically when the visible window "resets" without the benefit of the invention.

Figure 2:
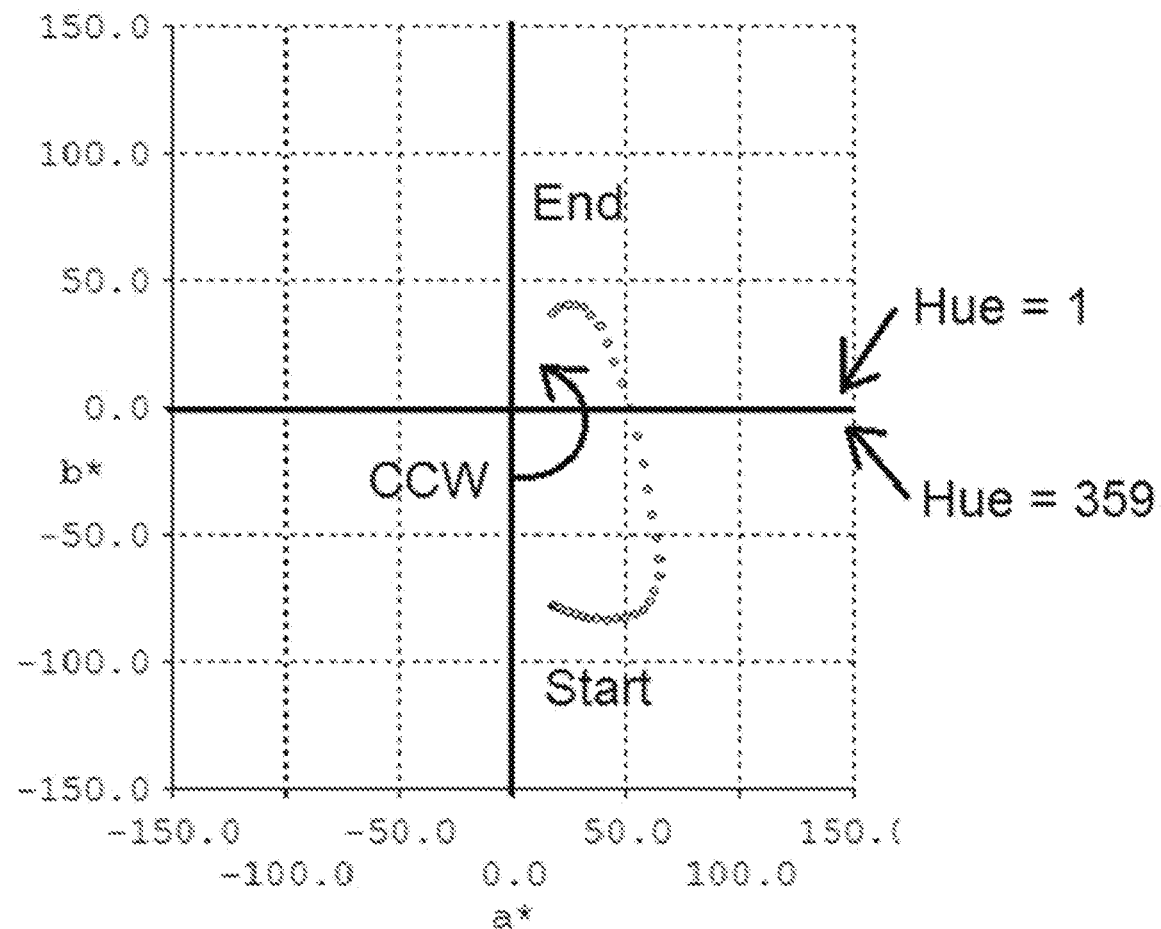
FIG. 2 illustrates a first color shift of a first color shifting pigment in L*a*b* color space according to an aspect of the invention.

As shown in FIG. 2, a first color shift of a first color shifting pigment is shown in L*a*b* color space, in which b* is the blue-yellow component (blue in the negative direction and yellow in the positive direction) and a* is the green-red component (green in the negative direction and red in the positive direction). The starting color is blue and the final color is red. The first color shift rotates counterclockwise relative to, and about, the origin of the L*a*b* color space.

Another way to describe the first color shift is by Hue. Hue is simply a measure of the angle of a point in color space relative to the origin in the L*a*b* color space plot. Translating the peak positions from the Blue_Red example of FIG. 2 into Hue values, the shift from blue, to purple, violet, and then to red becomes 270 degrees, 280 degrees, 330 degrees, 10 degrees. It can be seen that this method of description suffers from a similar "resetting" problem. This occurs because the hue must "reset" to 0 degrees after it reaches a maximum possible value of 360 degrees. While the present invention could be described as a technique that can reverse the rule that hue can only increase as viewing angle is increased, the periodic jump from 360 degrees back down to 0 degrees is difficult to explain.

Figure 3:
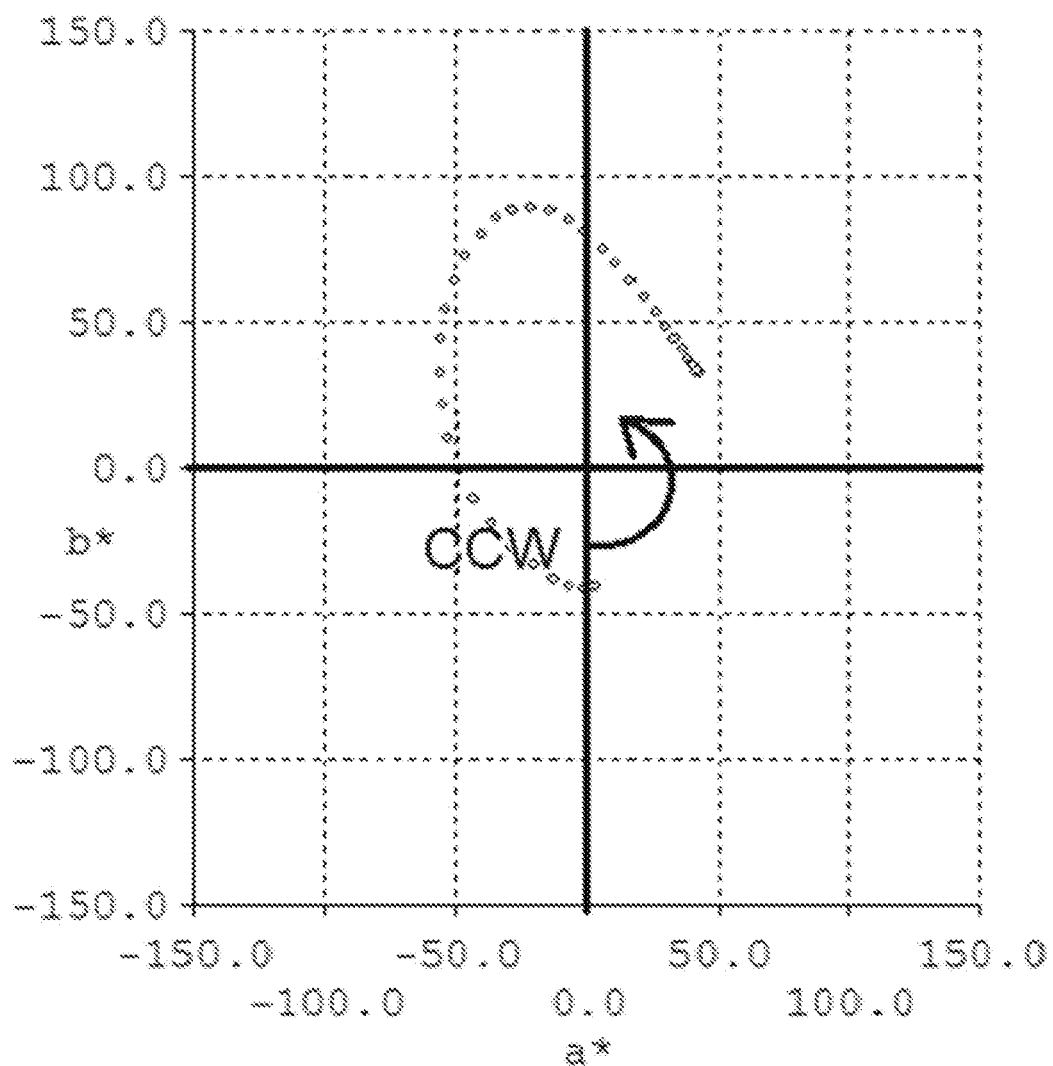
FIG. 3 illustrates a first color shift of a first color shifting pigment in L*a*b* color space according to an aspect of the invention.

The first color shift can be described in terms of the direction of color shift in the L*a*b* color space relative to the origin (0,0) in the a*b* plot. A color shift is counterclockwise about the origin. In particular, the colors seen by the human eye run in the direction of a repeating rainbow (red, orange, yellow, green, blue, violet, and back to red) as the viewing angle is increased. As another example, FIG. 3 illustrates a first color shifting pigment, such as a single cavity Fabry-Perot color shifting pigment. The starting color is gold and the final color is green. The first color shift rotates counterclockwise relative to, and about, the origin of the L*a*b* color space.

Within visible light, different wavelengths are perceived by a viewer as different colors. The wavelengths of visible light range from about 400 nm to about 700 nm. The shorter wavelengths are perceived as violet and the longest wavelengths are perceived as red. The first color shift counterclockwise about the origin has constrained the designers of security devices because the shifts have always been in one direction, as permitted by physics. The composition of the present invention can reverse the permissible direction of color shift making other color shifting colors possible, such as from gold to red.

Figure 4:
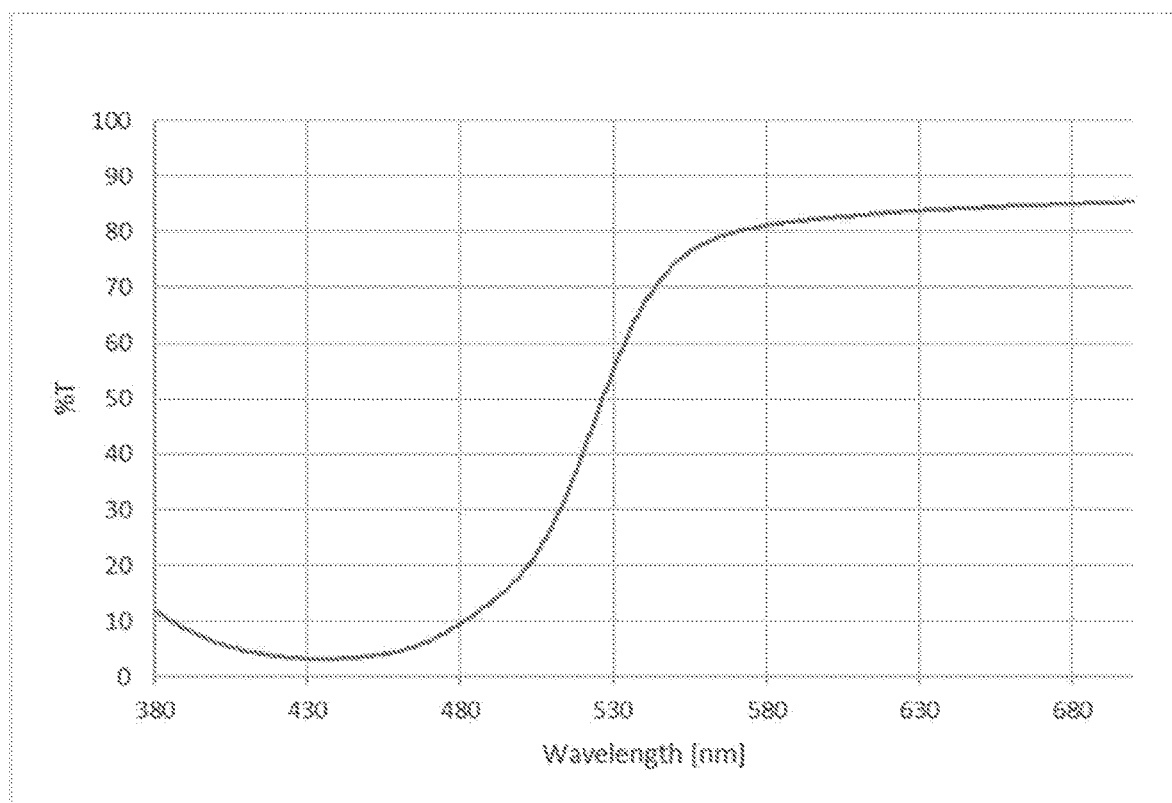
FIG. 4 illustrates the transmission of a color filter according to an aspect of the invention.

The composition can include a color filter. The color filter can transmit a portion of the first color shift of the first color shifting pigment and can absorb a remainder of the first color shift of the first color shifting pigment. In an aspect, the color filter does not transmit red or blue. FIG. 4 illustrates the transmission of a color filter, e.g., a yellow organic dye. As can be seen, the color filter does not transmit any colors having a wavelength less than about 530 nm, such as blue, but does transmit any colors having a wavelength greater than about 530 nm, such as yellow, orange, red.

The color filter can be applied as a layer on the first color shifting pigment. In this manner, the color filter can filter light that interacts with the first color shifting pigment, for example, the filtered light interacts in the same manner as a colored light source. In another aspect, the color filter can be included in at least one layer of the first color shifting pigment, in which the at least one layer is chosen from the reflector layer, the spacer layer, and the absorber layer.

The color filter can be a composition including a colorant, such as a pigment or a dye, and a liquid medium. The color filter can be a colorant. In an aspect, the color filter is a dye, such as an organic dye. In another aspect, the color filter is a nanosized pigment.

Non-limiting examples of suitable dyes can include FD&C dyes, acid dyes, direct dyes, reactive dyes, phthalocyanine dyes, derivatives of phthalocyanine sulfonic acids, and combinations thereof. Non-limiting examples of suitable organic dyes include copper phthalocyanine, perylene, anthraquinones, and the like; diarylmethane dyes, triarylmethane dyes, acridine dyes, quinolone dyes, thiazole dyes, indophenol dyes, oxazine dyes, thiazine dyes, natural dyes, azo dyes and azo metal dyes such as aluminum red RLW, aluminum copper, aluminum bordeaux RL, aluminum firered ML, aluminum red GLW, aluminum violet CLW, and the like; as well as combinations or mixtures thereof. Suitable dyes can include, but are in no way limited to, those listed in the Color Index International database, such as C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, C.I. Reactive Black 39, and combinations thereof.

Figure 5:
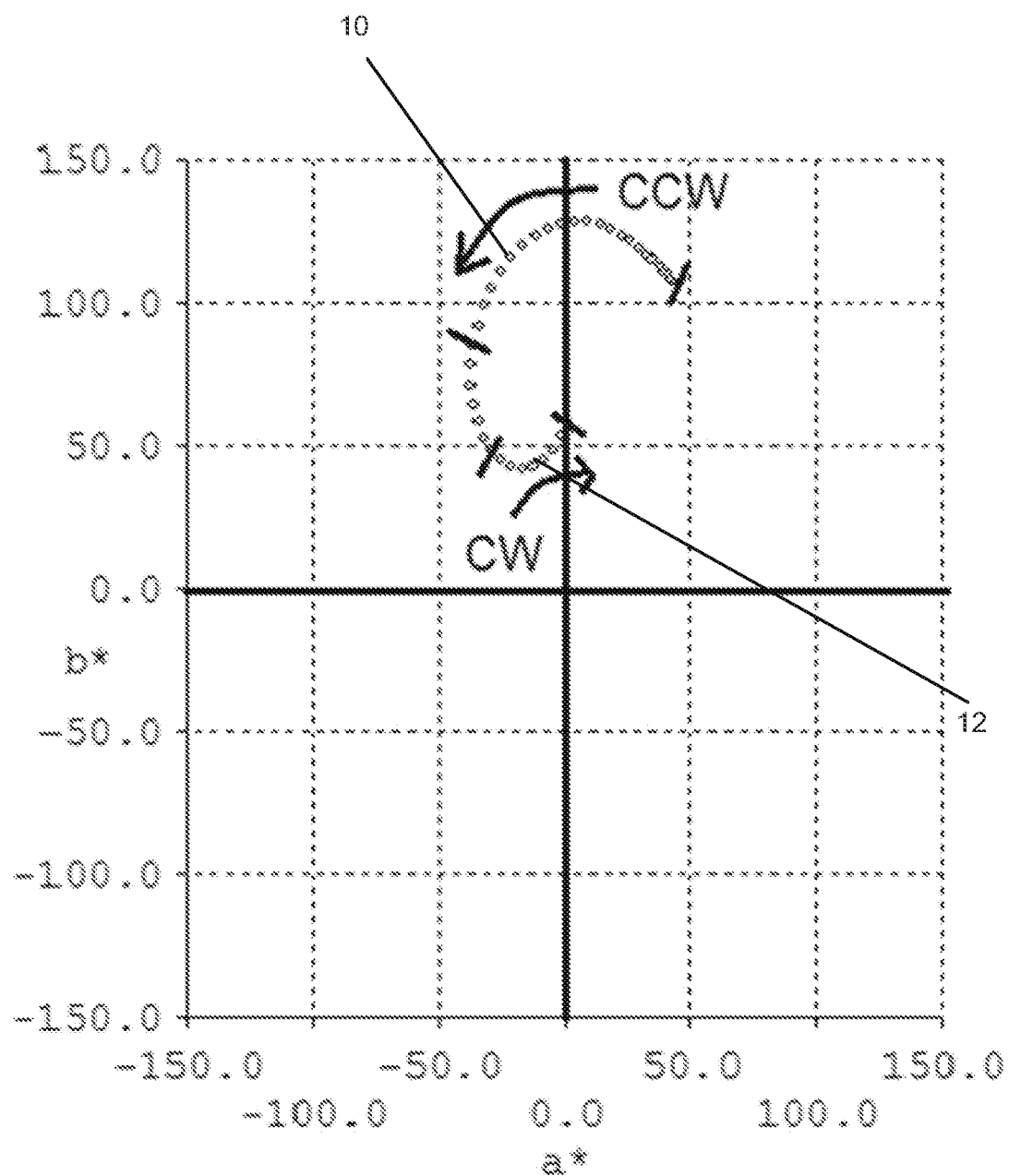
FIG. 5 illustrates a second color shift of the composition in L*a*b* color space according to an aspect of the invention.
Figure 6:
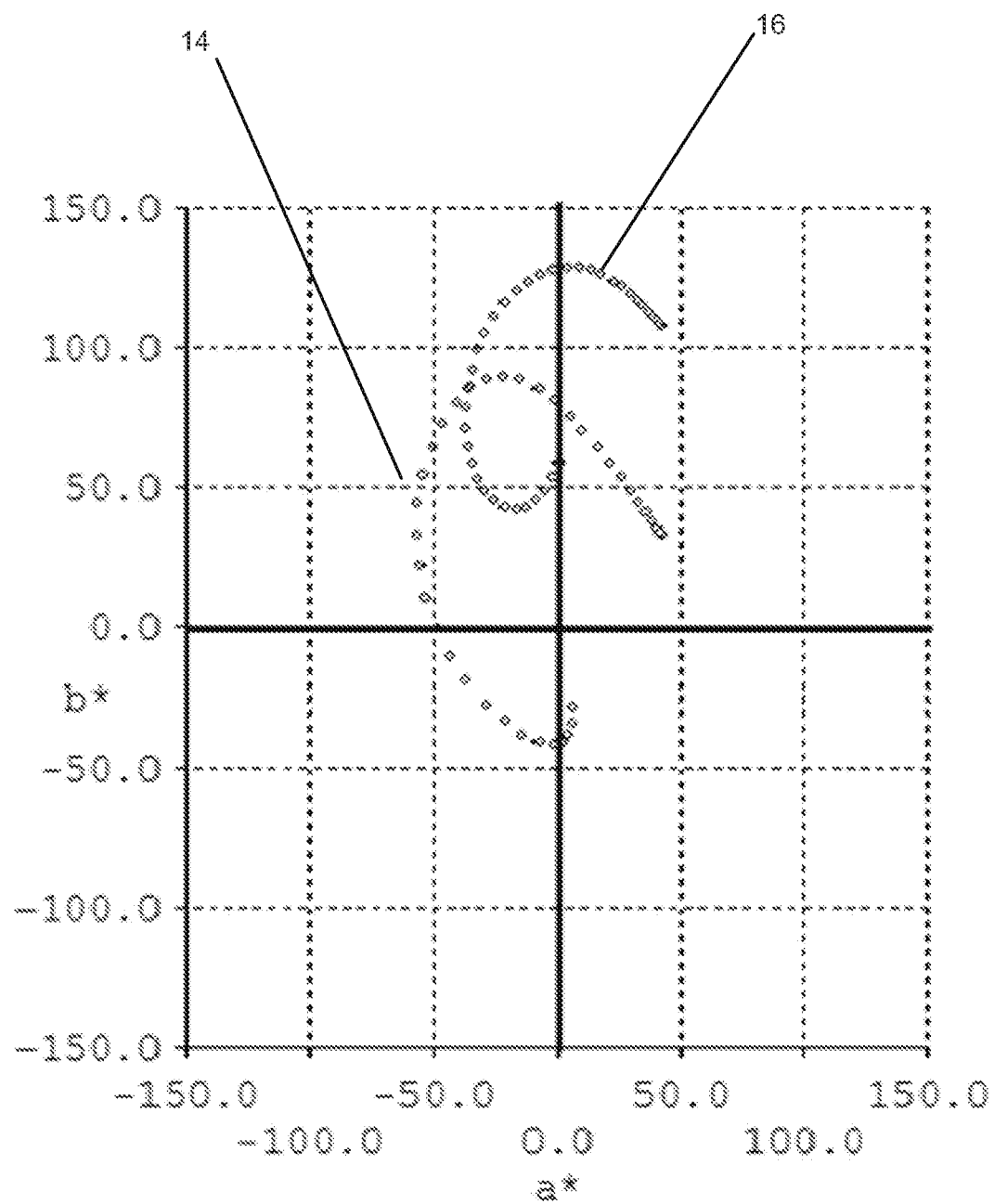
FIG. 6 illustrates the first color shift and the second color shift in L*a*b* color space according to an aspect of the invention.

The composition including the first color shifting pigment and the color filter can have a second color shift that is different from the first color shift of the first color shifting pigment. For example, a composition can include a first color shifting pigment having a first color shift from gold (starting color, longer wavelength) to green (final, shorter wavelength). The composition can also include a color filter, such as a yellow organic dye, that transmits a portion, such as wavelengths of yellow, orange, and red, of the first color shift of the first color shifting pigment. The color filter can absorb a remainder, such as wavelengths of blue and green, of the first color shift of the first color shifting pigment (i.e., that stops the transmission of blue and green). As shown in FIG. 5, the second color shift has a first portion 10 that rotates counterclockwise relative to the origin and a second portion 12 that rotates clockwise relative to the origin. In an aspect, the second color shift does not rotate about the origin. FIG. 6, a combination of FIGS. 3 and 5, illustrates that the composition can have a second color shift 16 that is different from the first color shift 14.

As shown in FIGS. 3, 5, and 6, the starting color (e.g. gold) and the final color (e.g. green) of the first color shifting pigment can be different from the starting color (vermillion) and the final color (e.g. red) of the composition (e.g., first color shifting pigment and color filter).

In an aspect, the starting color of the composition can have a higher chromaticity value as compared to the starting color of the first color shifting pigment.

In an aspect, the second color shift can extend over a range of hue from about 30 degrees to about 360 degrees, for example from about 45 degrees to about 270 degrees, and as a further example, from about 60 degrees to about 180 degrees.

The second color shift can extend over a range of viewing angle from about 10 degrees to about 90 degrees, for example from about 20 degrees to about 80 degrees, and as a further example, from about 25 degrees to about 75 degrees.

The composition can further include a carrier in which the first color shifting pigment, and the color filter are dispersed, thereby forming a colorant composition, such as an ink. The carrier can include solvents, various polymeric compositions, or organic binders such as, acrylic melamine, urethanes, polyesters, vinyl resins, acrylates, methyl methacrylate, ABS resins, epoxies, styrenes, mixtures thereof, as well as others well known to those skilled in the art, such as ink and paint formulations, for example those based on alkyd resins.

The composition can be applied to a surface of a substrate to form a security device, such as a banknote. The first color shifting pigment of the composition can be in the form of a flake, which can be randomly distributed throughout the composition. The color filter can be applied as a layer on the first color shifting pigment in the form of a flake. The flakes can be positioned parallel to a surface of the substrate.

A method of making the composition disclosed herein, can include selecting a first color shifting pigment having a first color shift that extends from a starting color at normal through a plurality of colors as a viewing angle is increased to a final color at perpendicular to normal, wherein the first color shift rotates counterclockwise relative to, and about, an origin of the L*a*b* color space; selecting a color filter that transmits a portion of the first color shift of the first color shifting pigment and absorbs a remainder of the first color shift of the first color shifting pigment; and combining the first color shifting pigment and the color filter to form a composition; wherein the composition has a second color shift different from the first color shift; and wherein the second color shift has a first portion that rotates counterclockwise relative to the origin and a second portion that rotates clockwise relative to the origin.

In the method of making, in an aspect, the color filter can be applied as a layer on the first color shifting pigment, which is in a form of a flake. In another aspect, the color filter can be included in at least one layer of the first color shifting pigment, wherein the at least one layer is chosen from the reflector layer, the spacer, and the absorber layer A method of authenticating a security device disclosed herein can include viewing, at a normal angle, an article imprinted with a composition, wherein the composition includes a first color shifting pigment having a first color shift that extends from a starting color at normal through a plurality of colors as a viewing angle is increased to a final color at perpendicular to normal, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; and viewing, at a viewing angle, the imprinted article; wherein the composition has a second color shift different from the first color shift; and wherein the second color shift has a first portion that rotates counterclockwise relative to the origin and a second portion that rotates clockwise relative to the origin.

EXAMPLES

Example 1—A first color shifting pigment that shifts between a starting color (gold at a normal) and a final color (red at a viewing angle) was used. The first color shifting pigment had a 4 quarter-wave at 542 nm, the color shifted from normal through 60 degrees with a conventional counterclockwise color travel. A color filter (yellow dye) was applied over the first color shifting pigment. The color filter shut down the color travel as the reflected color moved to wavelengths shorter than 530 nm. The result was a color shift from gold (normal color) toward green but plunging to dark, and reappearing as red (viewing color) at about 45 degrees. The chromaticity of both the normal color and the viewing color was high.

Example 2—A first color shifting pigment that shifts between a starting color (gold at a normal angle) and a final color (red at a viewing angle) was used. The first color shifting pigment had a 6 quarter-wave at 551 nm, the color shifted from normal through 60 degrees with a conventional counterclockwise color travel. A color filter (yellow dye) was applied over the first color shifting pigment. The color filter shut down the color travel as the reflected color moved to wavelengths shorter than 530 nm. The result was a faster color shift (as compared to Example 1) from gold (normal color) toward green but plunging to dark, and reappearing as red (viewing color) at about 35 degrees. The chromaticity of both the normal color and the viewing color was high.

There is also disclosed a kit including a first container including a first color shifting pigment; and a second container including a color filter, wherein a composition including the first color shifting pigment and the color filter exhibits a second color shift that has a first portion that rotates counterclockwise relative to an origin of the L*a*b* color space and a second portion that rotates clockwise relative to the origin.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This disclosure is to be broadly construed. It is intended that this disclosure disclose equivalents, means, systems and methods to achieve the devices, activities and mechanical actions disclosed herein. For each composition, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a composition and its many aspects, features and elements. Such a composition can be dynamic in its use and operation, this disclosure is intended to encompass the equivalents, means, systems and methods of the use of the composition and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A composition comprising:
a first color shifting pigment having a property of a first color shift that extends from a starting color at normal through a plurality of colors as a viewing angle is increased to a final color, wherein the first color shift rotates counterclockwise relative to, and about, an origin of the L*a*b* color space; and
a color filter having the ability to transmit a portion of the first color shift of the first color shifting pigment and having the ability to absorb a remainder of the first color shift of the first color shifting pigment;
wherein the composition has a property of a second color shift different from the first color shift; and
wherein the second color shift has a first portion that rotates counterclockwise relative to the origin and a second portion that rotates clockwise relative to the origin.

2. The composition of claim 1, wherein the first color shifting pigment includes at least the following layers: a reflector layer, a spacer layer, and an absorber layer.

3. The composition of claim 1, wherein each of the starting color and the final color of the first color shifting pigment are different from each of a starting color and a final color of the composition, respectively.

4. The composition of claim 3, wherein the starting color of the composition has a higher chromaticity value as compared to the starting color of the first color shifting pigment.

5. The composition of claim 1, wherein the second color shift of the composition is shorter in length than the first color shift of the first color shifting pigment.

6. The composition of claim 1, wherein the second color shift does not rotate about the origin.

7. The composition of claim 1, wherein the second color shift includes a small change in chroma over a length of the entire second color shift.

8. The composition of claim 1, wherein the color filter is applied as a layer on the first color shifting pigment.

9. The composition of claim 2, wherein the color filter is included in at least one layer of the first color shifting pigment, wherein the at least one layer is chosen from the reflector layer, the spacer layer, and the absorber layer.

10. The composition of claim 1, wherein the second color shift extends over a range of viewing angle from about 10 degrees to about 90 degrees.

11. The composition of claim 1, wherein the second color shift extends over a range of hue from about 30 degrees to about 360 degrees.

12. The composition of claim 1, wherein the color filter is an organic dye.

13. The composition of claim 1, wherein the color filter is a nanosized pigment.

14. The composition of claim 1, wherein the first color shifting pigment includes a magnetic layer.

15. A security device comprising,
a substrate; and the composition of claim 1.

16. The security device of claim 15, wherein the first coloring shifting pigment is in the form of a flake with the color filter as a layer on the flake, and wherein the flake is positioned parallel to a surface of the substrate.

17. A method of making a composition comprising:
selecting a first color shifting pigment having a property of a first color shift that extends from a starting color at normal through a plurality of colors as a viewing angle is increased to a final color at perpendicular to normal, wherein the first color shift rotates counterclockwise relative to, and about, an origin of the L*a*b* color space;
selecting a color filter having the ability to transmit a portion of the first color shift of the first color shifting pigment and having the ability to absorb a remainder of the first color shift of the first color shifting pigment; and
combining the first color shifting pigment and the color filter to form a composition;
wherein the composition has a property of a second color shift different from the first color shift; and
wherein the second color shift has a first portion that rotates counterclockwise relative to the origin and a second portion that rotates clockwise relative to the origin.

18. The method of claim 17, wherein the color filter is applied as a layer on the first color shifting pigment, which is in a form of a flake.

19. The method of claim 17, wherein the color filter is included in at least one layer of the first color shifting pigment, wherein the at least one layer is chosen from the reflector layer, the spacer, and the absorber layer.

20. A method of authenticating a security device, comprising:
viewing, at a normal angle, an article imprinted with a composition,
wherein the composition includes a first color shifting pigment having a first color shift that extends from a starting color at normal through a plurality of colors as a viewing angle is increased to a final color at perpendicular to normal, wherein the first color shift rotates counterclockwise relative to, and about, an origin of the L*a*b* color space; and a color filter that transmits a portion of the first color shift of the first color shifting pigment and absorbs a remainder of the first color shift of the first color shifting pigment; and
viewing, at a viewing angle, the imprinted article;
wherein the composition has a second color shift different from the first color shift; and
wherein the second color shift has a first portion that rotates counterclockwise relative to the origin and a second portion that rotates clockwise relative to the origin.

* * * * *